United States Patent
Kydd

[15] 3,678,987
[45] July 25, 1972

[54] ELASTOMERIC MOLD LINING FOR MAKING WAX REPLICA OF COMPLEX PART TO BE CAST

[72] Inventor: Paul H. Kydd, Scotia, NY
[73] Assignee: General Electric Company
[22] Filed: Dec. 28, 1970
[21] Appl. No.: 101,497

[52] U.S. Cl. ................................ 164/45, 264/225, 264/226
[51] Int. Cl. ........................................................ B22c 7/02
[58] Field of Search ............ 164/45; 249/112; 264/225, 226; 18/42 D, 42 R, DIG. 44

[56] References Cited

UNITED STATES PATENTS

| | | | |
|---|---|---|---|
| 2,316,143 | 4/1943 | Peebles et al. | 264/226 X |
| 2,714,226 | 8/1955 | Axelrad | 18/DIG. 44 |
| 3,141,915 | 7/1964 | Nieuwenhuls | 164/45 |
| 3,222,729 | 12/1965 | Boschi | 18/36 |
| 3,271,491 | 9/1966 | Mikkelborg | 164/45 UX |
| 3,596,316 | 8/1971 | Palermo et al. | 249/112 X |

FOREIGN PATENTS OR APPLICATIONS 669,117  3/1952  Great Britain .......................... 164/45

Primary Examiner—J. Spencer Overholser
Assistant Examiner—John E. Roethel
Attorney—Richard R. Brainard, Paul A. Frank, Charles T. Watts, Leo I. Malossi, Frank L. Neuhauser, Oscar B. Waddell and Joseph B. Forman

[57] ABSTRACT

Molding of the wax replica of a complex part preparatory to casting the part from metal is accomplished with an oversize mold cavity containing an elastomeric liner element bearing (on the inside face thereof) a negative of the surface of the complex part.

3 Claims, 3 Drawing Figures

Patented July 25, 1972

INVENTOR:
PAUL H. KYDD,
by [signature]
HIS ATTORNEY

Patented July 25, 1972

INVENTOR:
PAUL H. KYDD,
by Leo J. Marlossi
HIS ATTORNEY

ELASTOMERIC MOLD LINING FOR MAKING WAX REPLICA OF COMPLEX PART TO BE CAST

BACKGROUND OF THE INVENTION

The conventional method for molding wax impressions for the investment casting of turbine buckets is to make a metal die (or mold), the interior surface of which reproduces the configuration of the part to be cast. Thereafter, the metal die is filled with wax under pressure and the die pieces are separated to expose the wax replica of the part. Thereafter, a ceramic mold of the part is prepared to enable production of the metal part being duplicated.

This method has been adequate for most constructions, however, it has been found that when the part of which the wax impression is to be made is one which is sharply curved and twisted and, in addition, has fine detail impressed in the surface thereof, it is impossible to separate the enclosing die parts from the wax impression without destroying the fine detail unless the die surfaces covering the complex areas themselves are made in a number of parts, in some cases more than six pieces being required to accommodate the complex surfaces.

Thus, it would be very desirable to be able to utilize a simple, die (in which only two pieces thereof are required to mold the complex areas) for molding wax impressions of complex parts having fine surface detail.

SUMMARY OF THE INVENTION

The need set forth hereinabove is met by the instant invention wherein the molding of the wax replica of a complex part preparatory to preparing a ceramic shell mold for casting the part from metal is accomplished with an oversize die containing a preformed elastomeric liner element bearing on the interior face thereof a negative of the surface of the complex part.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
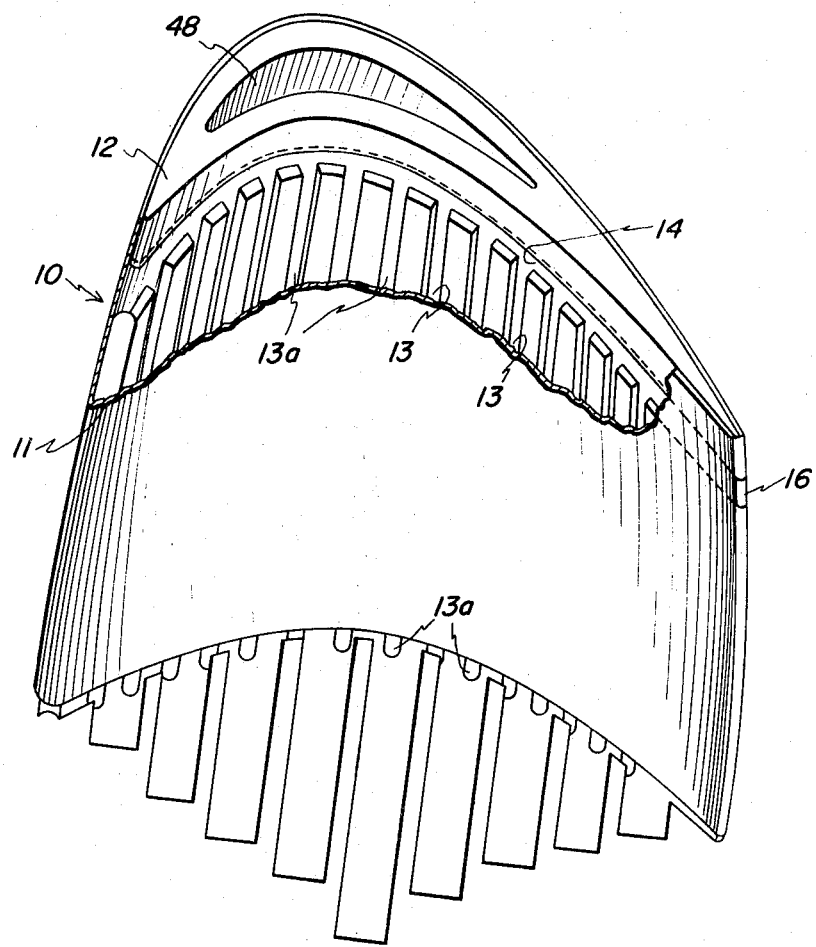
FIG. 1 is a three-dimensional view partially cut away to display the complex manifolding and discharge provisions in an open-circuit liquid-cooled turbine bucket as will require the use of this invention for preparation of the wax replica.

The turbine bucket 10 shown in FIG. 1 is an example of a bucket for a liquid cooled turbine described in U. S. Pat. application Ser. No. 93,057 — Kydd (incorporated by reference), filed Nov. 27, 1970 and assigned to the assignee of the instant invention.

Turbine bucket 10 consists of a sheet metal skin 11 affixed (e.g. by brazing) to investment cast hollow core 12 having integral spanwise extending grooves 13a formed therein. The rectangular cooling channels, or passages, 13 defined by skin 11 and grooves 13a conduct cooling liquid therethrough at a uniform depth beneath skin 11. At the upper ends thereof the rectangular cooling channels 13 on the pressure side of bucket 10 are in flow communication with and terminate at manifold 14 recessed into core 12. On the suction side of bucket 10 rectangular cooling channels 13 are in flow communication with and terminate at a second manifold 14a (FIG. 2) recessed into core 12. Near the trailing edge of bucket 10 a cross-over conduit (not shown) connects the aforementioned two manifolds. Requisite open-circuit cooling from these interconnected manifolds is provided by flow communication thereof with opening 16 from which the heated cooling fluids (gas or vapor and excess liquid coolant) exit at the trailing edge of bucket 10 as shown.

The root end of core 11 consists of a number of finger-like projections, or tines, 19 of varying length. The rim of the turbine disk (not shown) to which bucket 10 will be affixed has grooves machined therein extending to various depths and widths matching the different lengths and widths of bucket tines 19 such that the tines 19 will fit snuggly into the completed grooves in an interlocking relationship. Once the proper fit has been obtained, the tines 19 are brazed to the walls of the grooves formed in the turbine disk rim.

Preferably, tines 19 would be formed during the casting of hollow core 12 though these elements are not of immediate concern in the description of the instant invention and can be produced by subsequent machining. The portions of hollow core 12 presenting the problem to which this invention is directed in connection with the molding wax impressions are the pitch and tip sections of hollow core 12.

Problems in preparing wax impressions are greatly aggravated in the instant case since hollow core 12 is sharply curved and twisted, the cooling channels 13 with which the surface thereof is covered are very fine and measure approximately 0.20 inches deep and 0.25 inches wide, and still further complication is caused by the manifolds on the pressure and suction sides thereof, which run crosswise to the grooves 13a.

Figure 2:
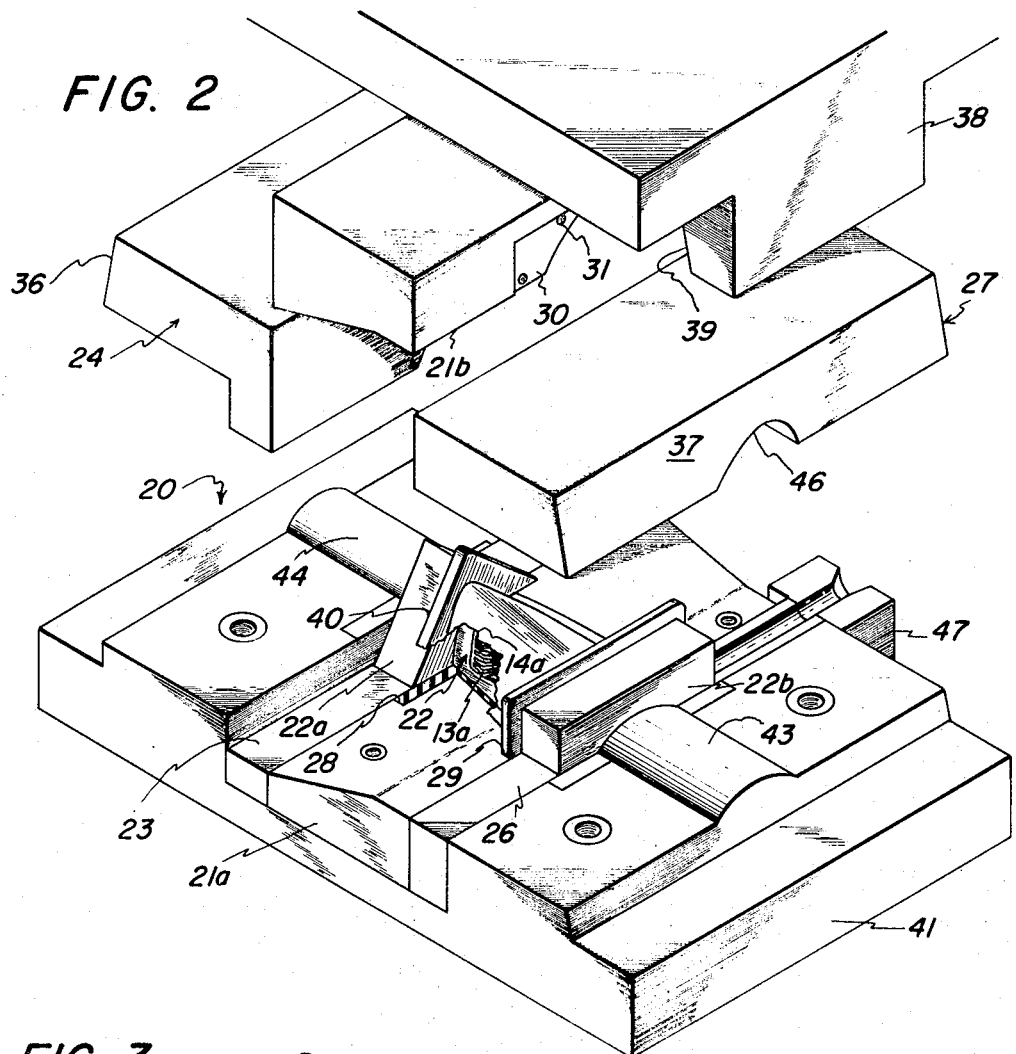
FIG. 2 is an exploded view showing the open mold, the master turbine bucket and the interposed elastomeric insert of this invention partially cut away.
Figure 3:
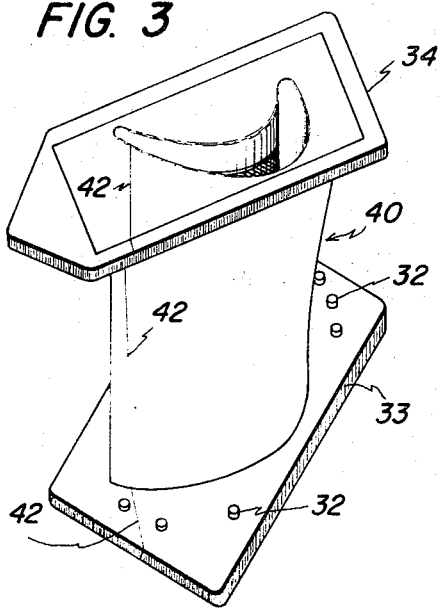
FIG. 3 is a three-dimensional view of the elastomeric mold lining of this invention for the casting of the wax replica of a liquid-cooled turbine bucket.

The construction of the instant invention making possible the use of a simpler die arrangement for molding wax impressions for complex surfaces having fine detail on the surface thereof is shown in FIGS. 2 and 3. Die 20 comprises two parts 21a and 21b to define a volume from 0.010 to 0.020 inches oversize with respect to the outside surfaces of the sidewalls of metal master bucket core 22 disposed therein. A clearance of relatively uniform thickness is thus made available over the entire complex portions of the bucket surface. Master bucket core 22 is shown with blocks 22a, 22b formed integral therewith at tip and root, respectively. These blocks resting in recesses, that are provided in die parts 23, 24, (and in parts 26 and 27) insure the disposition of master bucket core 22 in proper spaced relationship to the wall of the recesses in die members 21a and 21b. Also, tip and root blocks formed on the blades as cast may facilitate positioning the blades for the execution of operations to be conducted on the cast blades e.g. drilling of the cross-over conduit (not shown) interconnecting manifolds 14 and 14a. Other means may, of course, be devised to properly space master bucket core 22 in the cavity presented by mating die members 21a, 21b in which case blocks 22a, 22b may be eliminated.

In addition, recesses 28 and 29 in die element 21a and a pair of recesses in die element 21b in register therewith (of which only recess 30 is shown) are provided in communication with the space surrounding master bucket core 22. These open communicating volumes in the assembled die serve as the mold for an elastomeric liner 40 to be formed and utilized as described hereinbelow.

To form the liner 40, preferably master bucket 22 is covered with one or more layers of thin incompletely cured silicone rubber sufficient to slightly overfill the space defined between the blade, tip and root sections of bucket core 22 and the die elements 21a, 21b. Recesses 28, 29, 30 (and the companion recess not shown in die element 21b) are also slightly overfilled with the partially cured silicone rubber. This partially cured silicone rubber should be capable of being converted to the completely cured, solid, elastic state.

The term "silicone rubber" is intended to include both filled and unfilled organopolysiloxanes containing cure accelerators e.g. organic peroxides which are convertible to the cured, solid, elastic state by heating at elevated temperatures. In the completely cured state these materials can be readily deformed and molded. Obviously, other solid or liquid elastomeric materials such as natural rubber which can be molded and cured to the solid elastic state could be used in the practice of this invention.

The preparation of incompletely cured silicone rubber films useful in this invention is described in U. S. Pat. No. 3,325,330 — Robb (incorporated by reference).

When assembly of the die 20 has been accomplished enclosing master bucket core 22 and the partially cured silicone rubber disposed as described hereinabove, the silicone rubber is forced into all the grooves (13a, 14 and 14a) in the surface of master bucket core 22 and into all portions of the recesses 28, 29, 30 (and the companion recess thereto). Extra partially cured silicone rubber is forced into a number of small holes 31 leading off from the aforementioned recesses in order to provide locator nibs 32 formed in flanges 33, 34 of liner 40. Tapered surfaces 36, 37 formed on the sidewalls of die parts 24, 27, respectively, engage tapered surfaces formed on closure element 38 (e.g. surface 39) and enable the application of force to achieve tight surface-to-surface contact between all parts of the die (where such contact is required) as closure element 38 is urged toward base element 41. Alternatively, the elastomeric compound could be injected into the space between parts 21a and 21b to form liner 40 in the same manner as wax parts will later be molded in the properly lined mold.

After assembly, die 20 is placed in an oven and heated to a suitable curing temperature for the particular silicone rubber employed. When cure has been completed, the die 20 is removed from the oven and dismantled. Master bucket core 22 is readily removed along with liner 40 formed therearound with integral flanges 33, 34 located adjacent the respective surfaces of blocks 22a and 22b. Parting line 42 is then cut through liner 40 from top to bottom after which liner 40 may be stripped from bucket core 22. The inside surface of the cured elastomeric liner 40 will be found to have completely and accurately reproduced all details on the outer surface of master bucket core 22 e.g. the grooves for the cooling channels and manifolds and, as well, the curvature of the bucket core.

Thereafter, to cast any number of wax replicas of bucket core 22 it is merely necessary to reinsert the elastomeric liner element 40 into die 20 with a ceramic strip (not shown) disposed within liner 40 extending longitudinally thereof to preserve the hollow nature of the core 12 to be formed. Provisions are made to properly locate the ceramic strip, which projects beyond flanges 33, 34 and beyond the spaces previously occupied by the blocks 22a, 22b to rest upon surfaces 43, 44 shaped to mate with the underside of the ceramic strip. When die 20 is assembled, surface 46 and a similar surface in part 24 close over and closely match the top side of the ceramic strip. Thus, the ceramic strip can be properly aligned and held in sealing engagement to define portions thereof that are to project from the wax replica.

After assembly of mold 20 containing liner 40 and the ceramic strip, the mold is introduced into a vacuum housing in order to remove air from the interior thereof. Wax is poured through spout 47 to enter the space once occupied by block 22b, pass into the hollow center of liner 40 (around the ceramic strip) and the space previously occupied by block 22a. When all these volumes have been filled the wax is permitted to harden, the mold is opened and the wax replica of bucket core 22 with liner 40 therearound is removed. Liner 40 is then stripped from the wax replica leaving all surface details intact. Liner 40 can then be reused as described hereinabove.

A large number (as many as 36 or 48) of such wax replicas are disposed in a tree configuration commonly used in the investment casting art and the well-known techniques for ceramic shell mold formation and vacuum casting are then carried on to produce the metal bucket. These bucket cores as cast contain the ceramic strips (which had been embedded in each of the wax replicas) passing therethrough. Thereafter, these bucket cores are placed in molten salt to leach out the ceramic strip leaving the requisite hollow 48 extending through each bucket core 12.

This invention is particularly applicable to the preparation of replicas of warped bodies having much surface detail to be reproduced by casting, whether the replica be made of wax, thermoplastic or other such replicating material. The term "wax" as used in this specification and claims is intended to cover any of such replicating materials. These replicating materials are readily available commercially as are the ceramic powders used to make the ceramic shell molds for receiving the molten metal.

What I claim as new and desire to secure by Letters Patent of the United States is:

1. In the process of casting a wax replica of a warped body having fine surface detail thereover for the preparation of a ceramic shell mold of the warped body, the improvement comprising the steps of:
    a. employing a separable mold having an oversized cavity relative to the body of which the wax replica is to be prepared,
    b. locating in said cavity spaced from the walls thereof a master identical in shape and outer surface detail to said body,
    c. disposing a material that is heat-curable to a solid elastic state in the space between said master and the walls of said cavity,
    d. enclosing said master and said heat-curable material within said mold,
    e. curing said heat-curable material,
    f. opening said mold and removing said master and the three-dimensional cured elastomeric body formed thereover,
    g. separating said master and said elastomeric body,
    h. replacing said elastomeric body in said cavity as a liner therefor,
    i. closing said mold,
    j. introducing molten wax under pressure into the lined cavity,
    k. opening said mold,
    l. removing the solidified wax replica and the surrounding elastomeric body and
    m. separating said wax replica and elastomeric body.

2. The improvement of claim 1 wherein the heat-curable material is silicone rubber.

3. The improvement of claim 2 wherein the silicone rubber is partially cured.

* * * * *